US012594549B2

(12) United States Patent
Wilmer et al.

(10) Patent No.: US 12,594,549 B2
(45) Date of Patent: Apr. 7, 2026

(54) PLUNGER ROD AND METHOD FOR PRODUCING SUCH A PLUNGER ROD

(71) Applicant: Eppendorf SE, Hamburg (DE)

(72) Inventors: Jens Wilmer, Ahrensburg (DE); Jörg Sattler, Hamburg (DE); Jianzhao Lue, Norderstedt (DE)

(73) Assignee: Eppendorf SE, Hamburg (DE)

( * ) Notice: Subject to any disclaimer, the term of this patent is extended or adjusted under 35 U.S.C. 154(b) by 284 days.

(21) Appl. No.: 18/361,663

(22) Filed: Jul. 28, 2023

(65) Prior Publication Data

US 2024/0066517 A1 Feb. 29, 2024

(30) Foreign Application Priority Data

Aug. 30, 2022 (EP) .................................... 22193005

(51) Int. Cl.
*B01L 3/02* (2006.01)

(52) U.S. Cl.
CPC .................................. *B01L 3/0224* (2013.01)

(58) Field of Classification Search
CPC ................ B01L 3/0224; B01L 3/0275; B01L 2200/0689; B01L 2200/12; B01L 3/0227; B01L 3/021
See application file for complete search history.

(56) References Cited

U.S. PATENT DOCUMENTS

| | | | |
|---|---|---|---|
| 5,364,596 A | 11/1994 | Magnussen, Jr. et al. | |
| 5,511,433 A | 4/1996 | Sabloewski et al. | |
| 10,507,463 B2 | 12/2019 | Wilth et al. | |
| 12,290,805 B2 * | 5/2025 | Wilth | B01L 3/0234 |
| 2008/0006100 A1 | 1/2008 | Wilmer | |

(Continued)

FOREIGN PATENT DOCUMENTS

| | | |
|---|---|---|
| CN | 114682318 A | 7/2022 |
| DE | 10 2006 031 460 B4 | 10/2008 |
| EP | 0 455 043 A2 | 11/1991 |

(Continued)

OTHER PUBLICATIONS

Extended European Search Report of 22193005.0, Feb. 13, 2023, 8 pages.

(Continued)

*Primary Examiner* — Freddie Kirkland, III
(74) *Attorney, Agent, or Firm* — Grogan, Tuccillo & Vanderleeden, LLP

(57) ABSTRACT

The invention relates to a plunger rod (10) for a liquid transfer device (100), the plunger rod (10) being of two- or multipart construction. The plunger rod (10) has a first plunger rod component (12), in operative connection with an actuating device (110) of the liquid transfer device (100), and a second plunger rod component (14). The plunger rod (10) comprises a sealing seat (16) for receiving a sealing element (18) for the plunger rod (10), wherein a parting line (20) between the first plunger rod component (12) and the second plunger rod component (14) is configured so the sealing seat (16) is free of parting line flash (22). The invention includes a method for producing a plunger rod (10) and a liquid transfer device (100), in particular a pipette (102, 104, 106) and/or a multichannel bottom part (108) for a pipette (102, 104), with such a plunger rod (10).

14 Claims, 9 Drawing Sheets

(56) References Cited

U.S. PATENT DOCUMENTS

Figure 1:
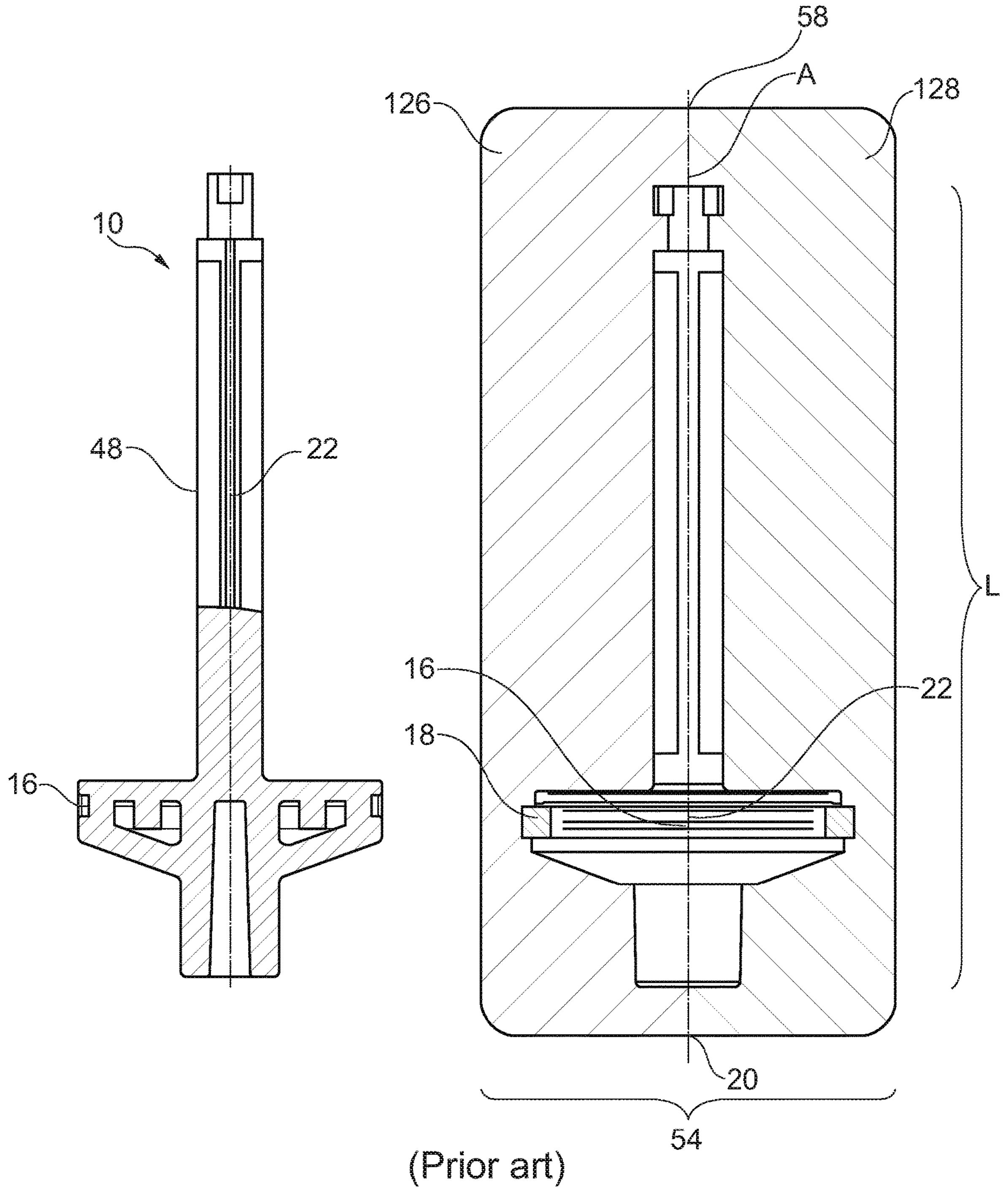
(Prior art) Fig. 1

| | | | |
|---|---|---|---|
| 2022/0001377 | A1 | 1/2022 | Wilth et al. |
| 2022/0016618 | A1 | 1/2022 | Kunsch et al. |

FOREIGN PATENT DOCUMENTS

| | | | |
|---|---|---|---|
| EP | 2 633 915 | B1 | 9/2013 |
| EP | 3 932 557 | A1 | 1/2022 |
| JP | H04-227859 | A | 8/1992 |
| JP | 2008-12533 | A | 1/2008 |
| JP | 2017-523029 | A | 8/2017 |
| JP | 2019-524306 | A | 9/2019 |
| JP | 2021-169199 | A | 10/2021 |
| JP | 2022-018092 | A | 1/2022 |

OTHER PUBLICATIONS

Japanese Office Action for JP Application No. 2023-138911 dated Oct. 28. 2024, with machine translation, 12 pages.

* cited by examiner

PLUNGER ROD AND METHOD FOR PRODUCING SUCH A PLUNGER ROD

CROSS-REFERENCE TO RELATED APPLICATION(S)

This application claims priority to European Patent Application No. EP22193005.0, filed on Aug. 30, 2022, the entire content of which is incorporated herein by reference.

The invention relates to a plunger rod for a liquid transfer system, in particular a pipette or a multichannel bottom part for a pipette, to a method for producing such a plunger rod and to a liquid transfer system with such a plunger rod according to the preamble of the independent claims.

Pipettes are used in particular in a laboratory setting for controlled drawing up and delivery of liquids. To this end, a pipette tip with an upper opening is firmly clamped onto a pipette seat. The seat is preferably formed as a conical or cylindrical projection on the pipette body. The pipette tip can draw up and deliver liquid through a lower opening. Air displacement pipettes comprise a displacement device for air which is in communicative connection with the pipette tip through a hole in the seat. By way of the displacement device, an air cushion is moved such that liquid is aspirated into the pipette tip and expelled therefrom. To this end, the displacement device has a displacement chamber with a movable boundary element. The displacement device is usually a cylinder with a plunger rod movable therein. A sealing element is arranged on the plunger rod and seals the plunger rod relative to a cylinder surrounding the plunger rod.

Multichannel fluid transfer devices are in particular multichannel pipettes and multichannel dispensers, which are intended for the calibrated aspiration of liquids and/or subsequent delivery of the liquids into containers. While aspirating and dispensing the liquid, the multichannel fluid transfer device is held in an operator's hand. A multichannel fluid transfer device has a top part, in which are arranged the operating elements and the mechanical components or electronics needed to aspirate the liquid, and a multichannel bottom part with a plurality of parallel-arranged dispensing channels, which are designed to draw up and/or deliver a liquid.

The precision and accuracy of the volume that is aspirated depends on the ability of each displacement element to reproduce the same, simultaneous travel for a given volume setting. It has been observed, however, that when a multichannel pipette is in use, the plunger actuator has a tendency not to maintain orthogonality to the sliding direction during movement. This effect, known as tilting clearance, arises during the reciprocating motion of the plunger actuator and the displacement elements and results in a difference in the distance traveled by one displacement element relative to another displacement element, thus reducing the precision and accuracy of the aspirated volume among the plurality of displacement elements. This rake effect may be caused by excessive guide clearance between the plunger actuator and the plunger actuator guide, by an unsuitable shape or hardness of the restoring spring, which is used to raise the plunger actuator, by excessively low rigidity of the plunger actuator guide and by different levels of friction at the seals of the displacement elements. The displacement elements in each case comprise a plunger rod on which a sealing element is arranged.

DE 10 2006 031 460 B4 discloses a multichannel pipette for dispensing liquids which has a plunger and a plurality of receptacles arranged at one end of the plunger actuator rod for in each case one plunger head. A resilient element which assists in centering the plunger in the receptacle is arranged between the plungers of the individual channels of the multichannel pipette and the receptacle for the respective plunger head.

EP 2 633 915 B1 discloses a manual single channel air displacement pipette with a body with a cylindrical displacement chamber formed therein in which a plunger with a plunger rod and a seal for drawing up and subsequently delivering a liquid is displaceable.

A disadvantage of the solutions known from the prior art, however, is that the plunger rod takes the form of a one-piece injection molding. To enable simple demolding of the plunger rod from the injection mold, a mold parting line is generally provided along a longitudinal axis of the plunger rod, resulting in the plunger rod having mold-related parting line flash over its entire length. This parting line flash may be removed at least in part in a deflashing process subsequent to the injection molding process, for example by vibratory finishing, abrasive blasting or tumbling. This entails the risk of the mold-related parting line flash not being fully removed in the region of a sealing seat of the plunger rod and/or of residual particles from the deflashing process adhering to the plunger rod, possibly leading, during operation of the pipette or of the multichannel bottom part, to a lack of tightness in the region of a sealing element drawn onto the plunger rod because the sealing element does not lie completely tightly against the plunger rod or particles of the parting line flash get in between the sealing element and the sealing seat formed on the plunger rod. Such a lack of tightness can only be identified on the finished product during final tightness testing of the pipette or of the multichannel bottom part. Replacing the plunger rod requires a lot of effort, which is associated with high assembly costs. There is also a risk of a leak arising before the pipette reaches the intended end of its service life, which will result in a customer complaint.

The object of the invention is consequently to avoid leaks between a plunger rod and a sealing element arranged on the plunger rod and so to enhance the tightness and service life of a liquid transfer system, in particular of a pipette.

The object is achieved by a plunger rod for a liquid transfer system. The plunger rod in this case is of two- or multipart construction and has a first plunger rod component which may be brought into operative connection with an actuating device of the liquid dispensing system. The plunger rod further comprises a second plunger rod component different from the first plunger rod component, and a sealing seat for accommodating a sealing element for the plunger rod. A parting line is formed in this case between the first plunger rod component and the second plunger rod component in such a way that the sealing seat is free of parting line flash.

A multipart configuration of the plunger rod can prevent an injection mold parting line and the associated parting line flash from forming in the region of the sealing seat. In this way, a sealing element can be prevented from lying in a non-fluid-tight manner against the sealing seat of the plunger rod and causing a leak at this point, which would lead to labor-intensive and costly refinishing during assembly since such a leak is only identified during final tightness testing of the liquid transfer device. A potential source of risk in terms of wear to the sealing element, which shortens the service life of the sealing element and can have a negative effect on the life of the liquid transfer device, can moreover be eliminated.

The features set out in the dependent claims enable advantageous improvements and further developments of the plunger rod stated in the independent claim.

In a preferred configuration of the plunger rod, provision is made for the second plunger rod component to be arranged or configured concentrically to the first plunger rod component. To ensure tightness between the plunger rod and a cylinder surrounding the plunger rod, tight manufacturing tolerances are needed for the plunger rod. Differences in roundness may in particular lead to the sealing element sealing inadequately either relative to the plunger rod or to a cylinder wall of the cylinder. To be able to comply with these tight tolerances, it is advantageous for the second plunger rod component to be arranged or configured concentrically to the first plunger rod component.

In one advantageous configuration of the plunger rod, provision is made for the sealing seat for receiving the sealing element to be formed between the first plunger rod component and the second plunger rod component. This is a simple way of preventing a mold parting line from running through the sealing seat on the plunger rod. Instead, the division into two components allows demolding requiring no mold parting line in the region of the sealing seat and thus producing a parting line flash-free outcome. In this way, the risk of a potential leak due to the sealing element lying poorly against the sealing seat can be eliminated. Furthermore, the sealing element may be simply guided and held in position by such a configuration.

It is particularly preferable, in this respect, for the first plunger rod component to have a fastening mechanism for a plunger actuator of a pipette or a multichannel bottom part for a pipette at its end remote from the sealing seat. In particular in the case of multichannel bottom parts for pipettes, there is a need for a plurality of plunger rods to be guided in parallel and with a high level of accuracy. To this end, a "plunger actuator" is generally used, which engages in an end portion of the respective plunger rod and thus enables parallel displacement of multiple plunger rods, such that the same quantity of liquid is in each case drawn up into the various cylinders of the multichannel bottom part.

According to one advantageous configuration of the plunger rod, provision is made for the second plunger rod component to be configured as a plunger tip, which is arranged as an axial extension of the first plunger rod component. In particular in the case of small plungers, as are used for the individual channels of a multichannel bottom part to draw up liquid, small plunger rods with a small diameter are needed. It is precisely in the case of narrow plungers with a small diameter that it may be particularly advantageous to connect a plunger tip, which extends the first plunger rod component in the axial direction, with the first plunger rod component in order to form a sealing seat without parting line flash.

It is particularly preferable, in this respect, for the plunger tip to be materially bonded to the first plunger rod component by way of a two-component injection molding method. A two-component injection molding method should be understood in this context to mean a two-stage injection molding method in which the second plunger rod component is produced in the form of the plunger tip in a first injection molding method and the second plunger rod component is molded on in a second injection molding method. The same plastics or different plastics can be used for the two injection molding methods. For the purposes of this patent application, a two-component molding method should also be understood to mean the use of two identical plastic materials in a two-stage injection molding method. A material bond produced by way of a two-component injection molding method enables particularly precise centering of the plunger tip relative to the first plunger rod component. In this way, the roundness requirements for the sealing seat can be particularly precisely complied with and tightness against the plunger rod enhanced.

Alternatively, a further preferred configuration of the plunger rod provides for the second plunger rod component to be configured as a cover or a dish, which is connected interlockingly or force-lockingly with the first plunger rod component. It is precisely in the case of relatively large plunger rods, as are used for example in single channel pipettes, that it may be advantageous to use a plunger rod constructed of two or more components. In order to comparatively straightforwardly form a sealing seat on the plunger rod which is free of parting line flash, the plunger rod is formed in two parts from a substantially elongate and cylindrical first plunger rod component and a cover or dish arranged on this first plunger rod component. Demolding of the cover or dish from an injection mold is particularly simple due to the simple geometry, which may be configured in particular without undercuts. Furthermore, the first plunger rod component can be of comparatively simple construction and the inclined surfaces needed for demolding can be provided without them extending over a sealing seat of the plunger rod.

It is particularly preferable, in this respect, for the first plunger rod component to have a shaft, wherein a recess is formed in the shaft for form-locking connection of the cover or dish to the shaft by way of a latching connection. In order to straightforwardly position the dish or cover relative to the first plunger rod component and thus to form the sealing seat, it is advantageous when a recess for form-locking connection of the cover or dish to the first plunger rod component is formed in the shaft of the first plunger rod component.

In a further improvement of the plunger rod, provision is made for the cover or dish to have a central opening, wherein at least one latching lug is formed at the central opening for latching into the recess in the shaft of the first plunger rod component. The dish or cover can be pushed simply and with application of little force by way of a central opening onto the first plunger rod component. The latching lug allows the dish or cover to be latched in the recess of the first plunger rod component, so enabling locking of the cover or dish in a defined position relative to the first plunger rod component. The latching lug on the dish or cover and the recess in the shaft may in particular be incorporated into the respective injection mold and thus produced in a substantially cost-neutral manner.

In a preferred configuration of the plunger rod, provision is made for the first plunger rod component and the second plunger rod component to be made of a plastics material, preferably of a thermoplastic, particularly preferably of polyoxymethylene (POM), polyetherether ketone (PEEK), polyarylether ketone (PAEK), polyamide (PA) or polyphenylene sulfide (PPS). Plastic materials are particularly suitable for use in laboratory devices such as pipettes due to their high level of chemical resistance and their low weight. Due to the stringent requirements regarding the geometry and tolerances of the two components of the plunger rod, thermoplastics are particularly suitable for reliably providing the required tolerances regarding length, diameter, position and component shrinkage after the injection molding process.

It is particularly preferable, in this respect, for the first plunger rod component and the second plunger rod component to be made from the same plastics material. In this way, it can be ensured that the two components have the same shrinkage behavior after the injection molding method and the same thermal expansion. In this way, it can be ensured that the components of the plunger rod do not move relative to one another or loosen due to repeated heating and cooling, for example during autoclaving of the liquid transfer device.

Alternatively, the first plunger rod component may also be constructed from a first plastics material, in particular a first thermoplastics and the second plunger rod component from a second plastics material, in particular a second thermoplastic, different from the first plastics material. In this way, the hardness and wear resistance of the components can be adapted to the respective requirements of the components of the plunger rod.

A further sub-aspect of the invention relates to a method for producing such a plunger rod. The method here comprises the following steps:

- producing a second plunger rod component of the plunger rod in a first injection molding process,
- producing a first plunger rod component of the plunger rod in a second injection molding process,
- connecting the first plunger rod component of the plunger rod to the second plunger rod component of the plunger rod, wherein a sealing seat for receiving a sealing element for the plunger rod is located away from a mold parting line of an injection mold for producing the plunger rod.

Using the described method, a plunger rod for a liquid transfer device may be produced which is formed free of parting line flash in the region of the sealing seat and thus enables improved sealing against the shaft of the plunger rod. In this way, a sealing element can be prevented from lying in a non-fluid-tight manner against the sealing seat of the plunger rod and causing a leak at this point, which would lead to labor-intensive and costly refinishing during assembly since such a leak is only identified during final tightness testing of the liquid transfer device. A potential source of risk in terms of wear to the sealing element, which shortens the service life of the sealing element and can have a negative effect on the life of the liquid transfer device, can moreover be eliminated.

In one advantageous configuration of the method, provision is made for the plunger rod to be produced using a two-component injection molding method in which the second plunger rod component is produced in a first injection molding process and this second plunger rod component is molded around in sections in a second injection molding process by the first plunger rod component, such that the second plunger rod component is concentric to the first plunger rod component and extends in the axial direction as an extension of the first plunger rod component. A material bond produced by way of a two-component injection molding method enables particularly precise centering of the second plunger rod component relative to the first plunger rod component. In this way, the roundness requirements for the sealing seat can be particularly precisely complied with and tightness against the plunger rod enhanced.

It is particularly preferable, in this respect, for the second plunger rod component to be inserted as an insert into the injection mold for the second injection molding process to produce the first plunger rod component. In this way, particularly tight manufacturing tolerances can be achieved regarding position, roundness and concentricity between the first plunger rod component and the second plunger rod component.

In an alternative embodiment of the method, provision is made for the second plunger rod component to be pulled, by way of a central opening in the second plunger rod component, onto the first plunger rod component and connected force-lockingly or interlockingly therewith. In this way, a plunger rod can be produced which may be assembled simply from two components and is constructed such that the region of the sealing seat is free of a potential source of risk in the form of parting line flash formed by an injection mold parting line.

According to a further alternative embodiment of the method, provision is made for the first plunger rod component and the second plunger rod component to be materially bonded together using spin welding. A spin welding method is a suitable method, in particular for relatively large plungers, for bonding the two plunger rod components materially together with tight manufacturing tolerances. Provision is made, in this case, for a weld from the spin welding method to be located away from the sealing seat, such that the sealing seat is free of weld residues or accumulated material resulting from the welding method.

A further sub-aspect of the invention relates to a liquid transfer device for drawing up and subsequent delivery of a liquid with such a plunger rod. To improve the service life and tightness of a liquid transfer device and avoid potential refinishing during assembly as a result of leaks, it is advantageous to use a plunger rod according to the invention in a liquid transfer device. The liquid transfer device may in particular be a pipette, in particular a manual or an electronic, hand-held pipette. Alternatively or in addition, the liquid transfer device may also be or comprise a multichannel bottom part for a pipette. In a further alternative embodiment, the liquid transfer device may comprise a dispensing tool for an automatic dispenser, in particular an automatic dispenser used in laboratory technology, particularly preferably an automatic pipette.

The different embodiments of the invention set out in this application are advantageously combinable with one another unless otherwise specified.

Figure 2:
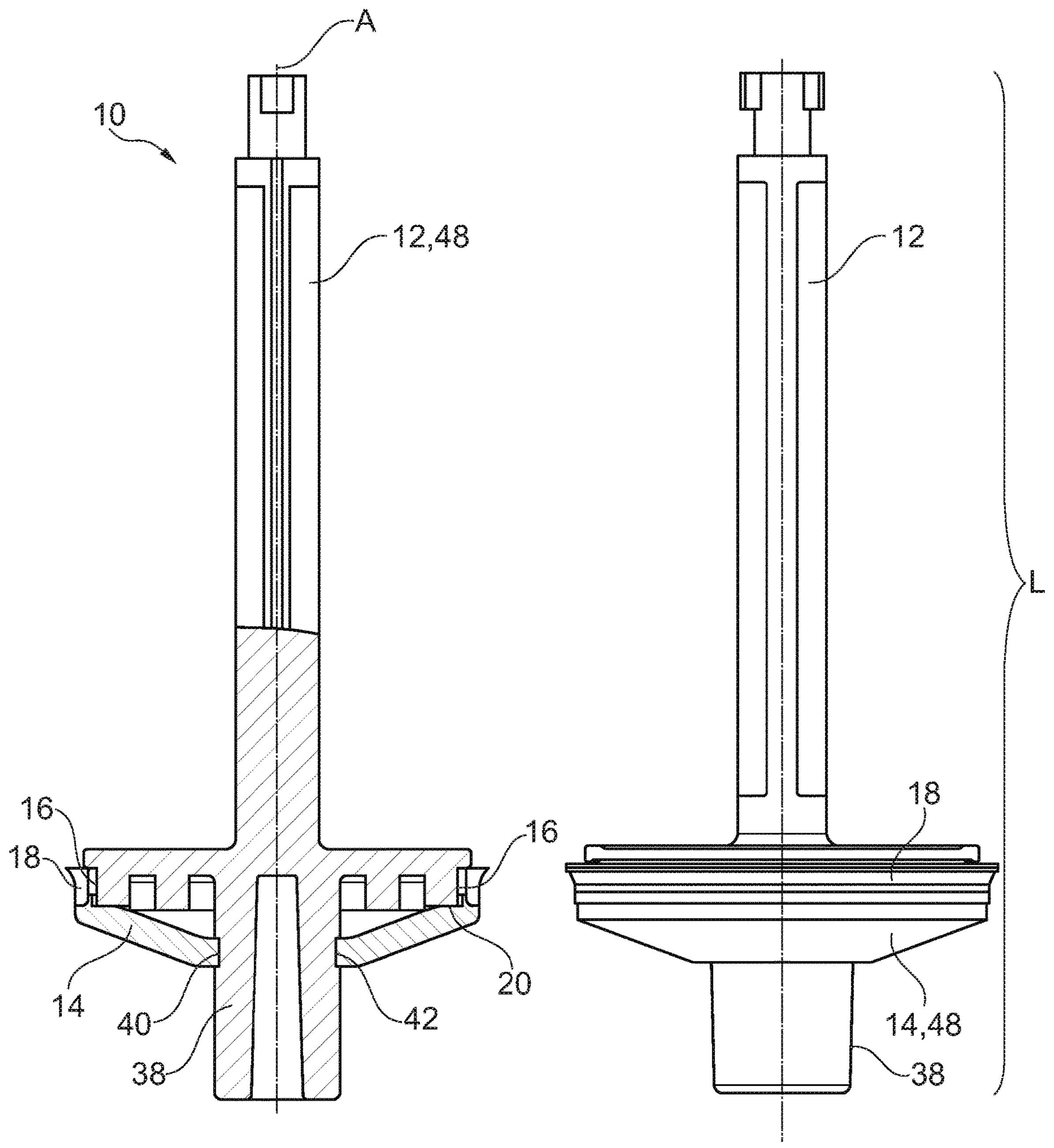
Figure 3:
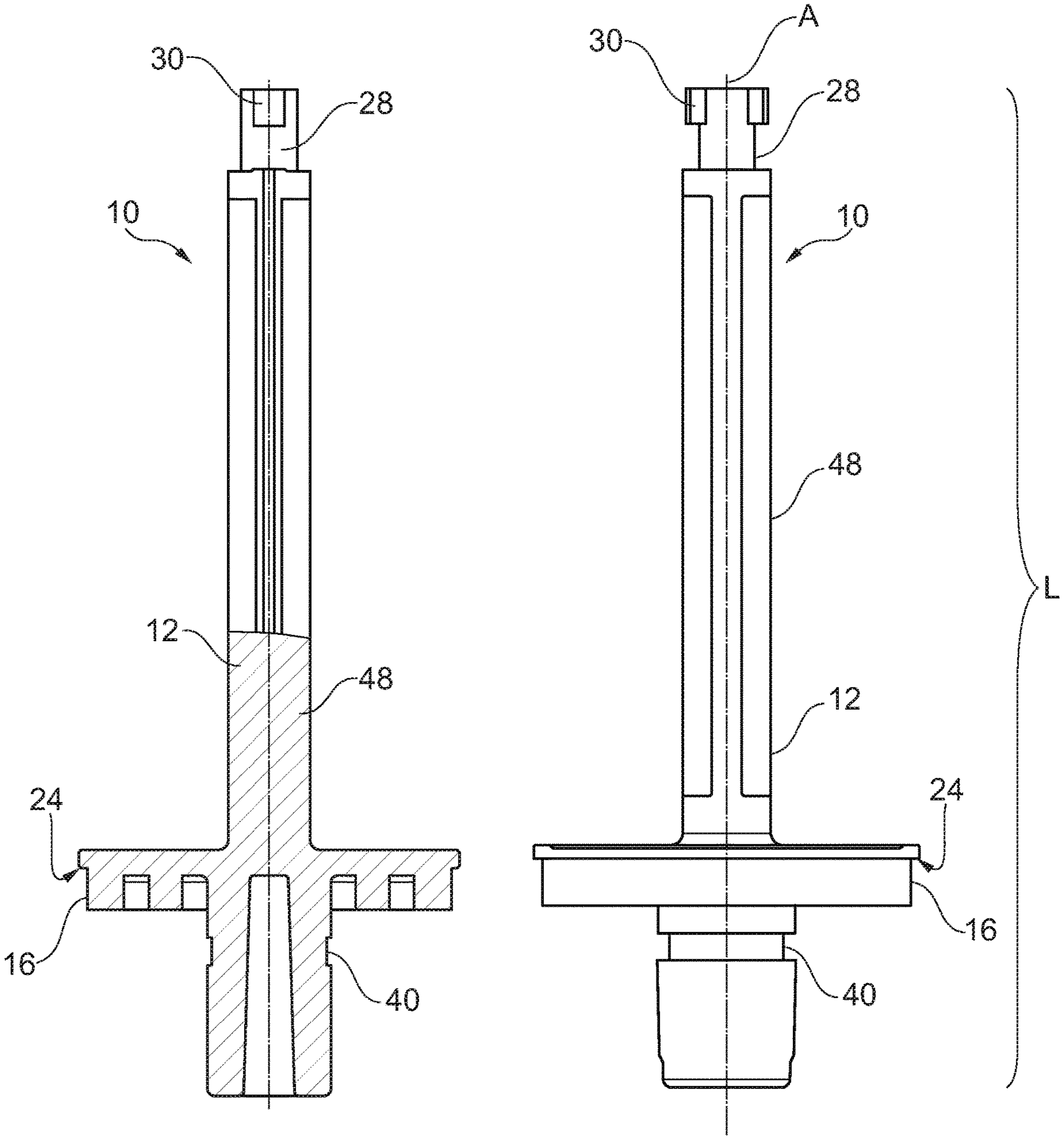
Figure 4:
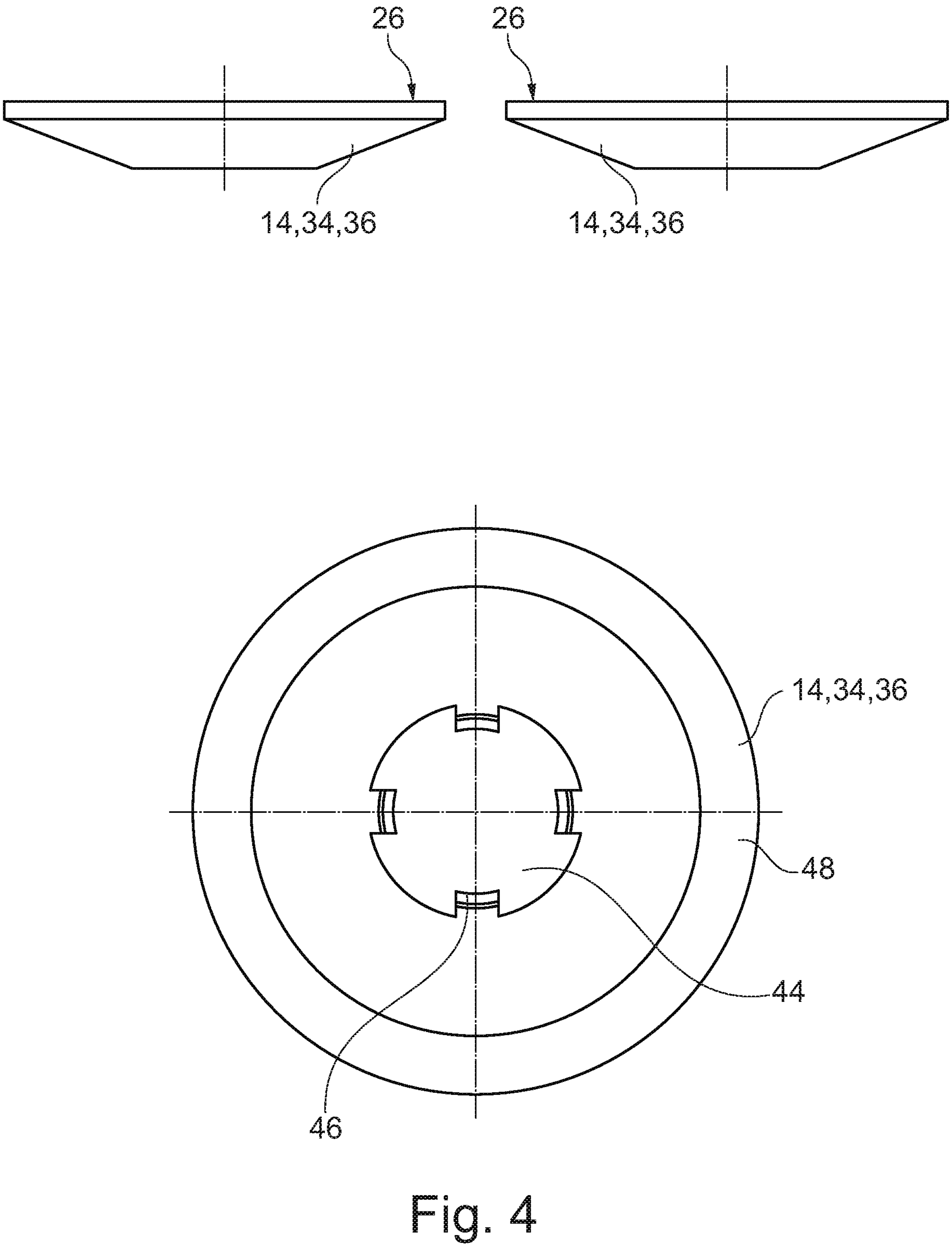
Figure 5:
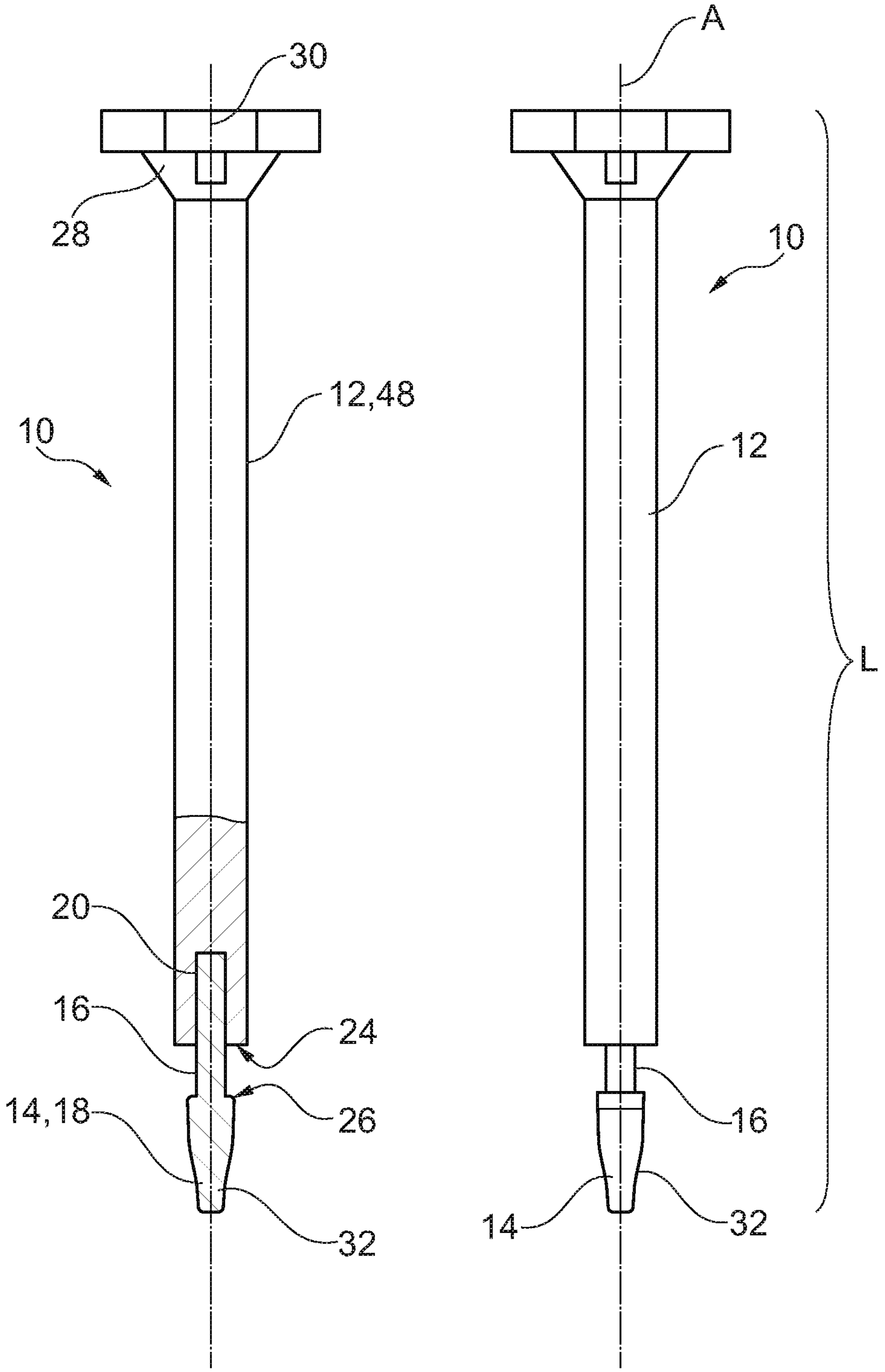
Figure 6:
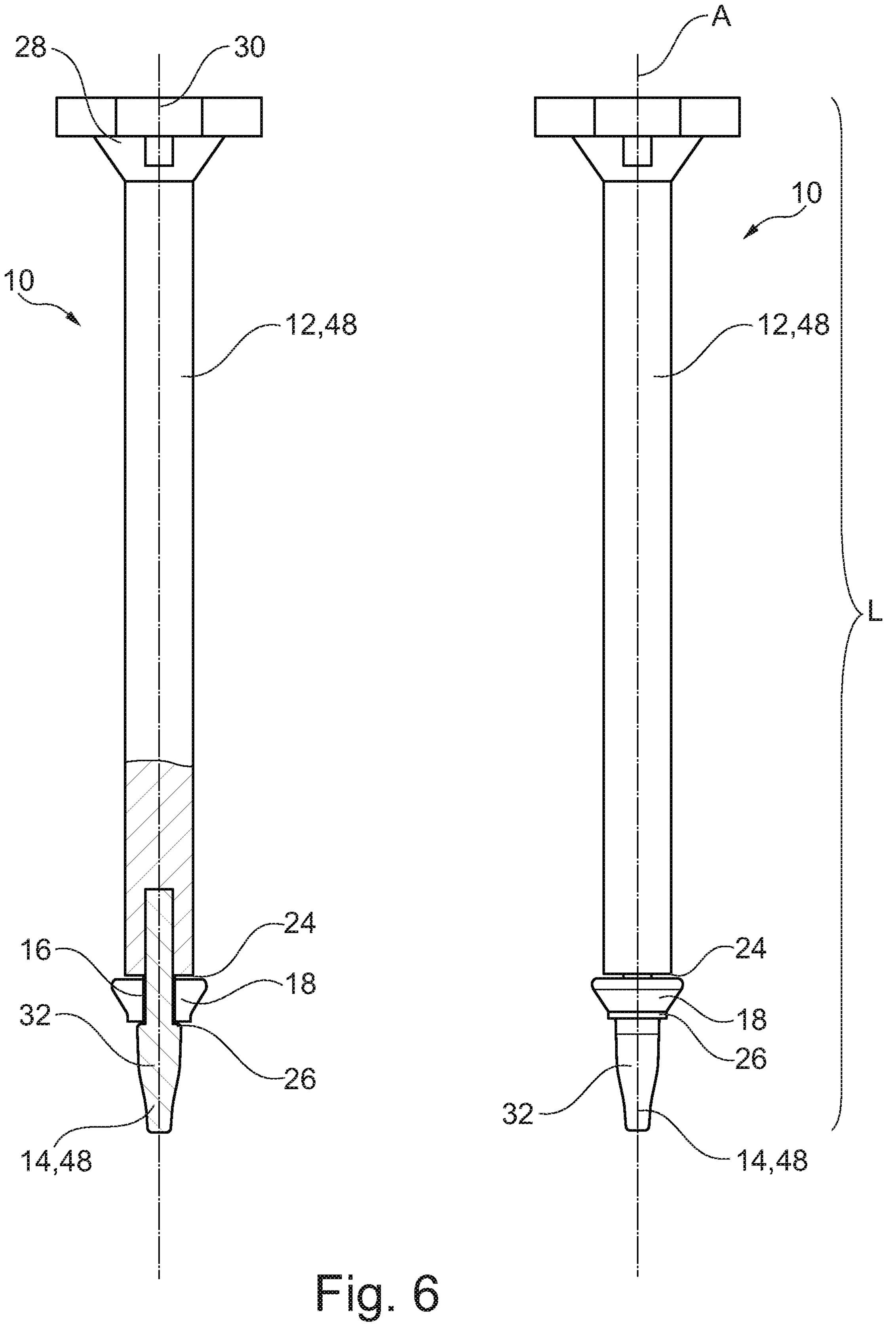
Figure 7:
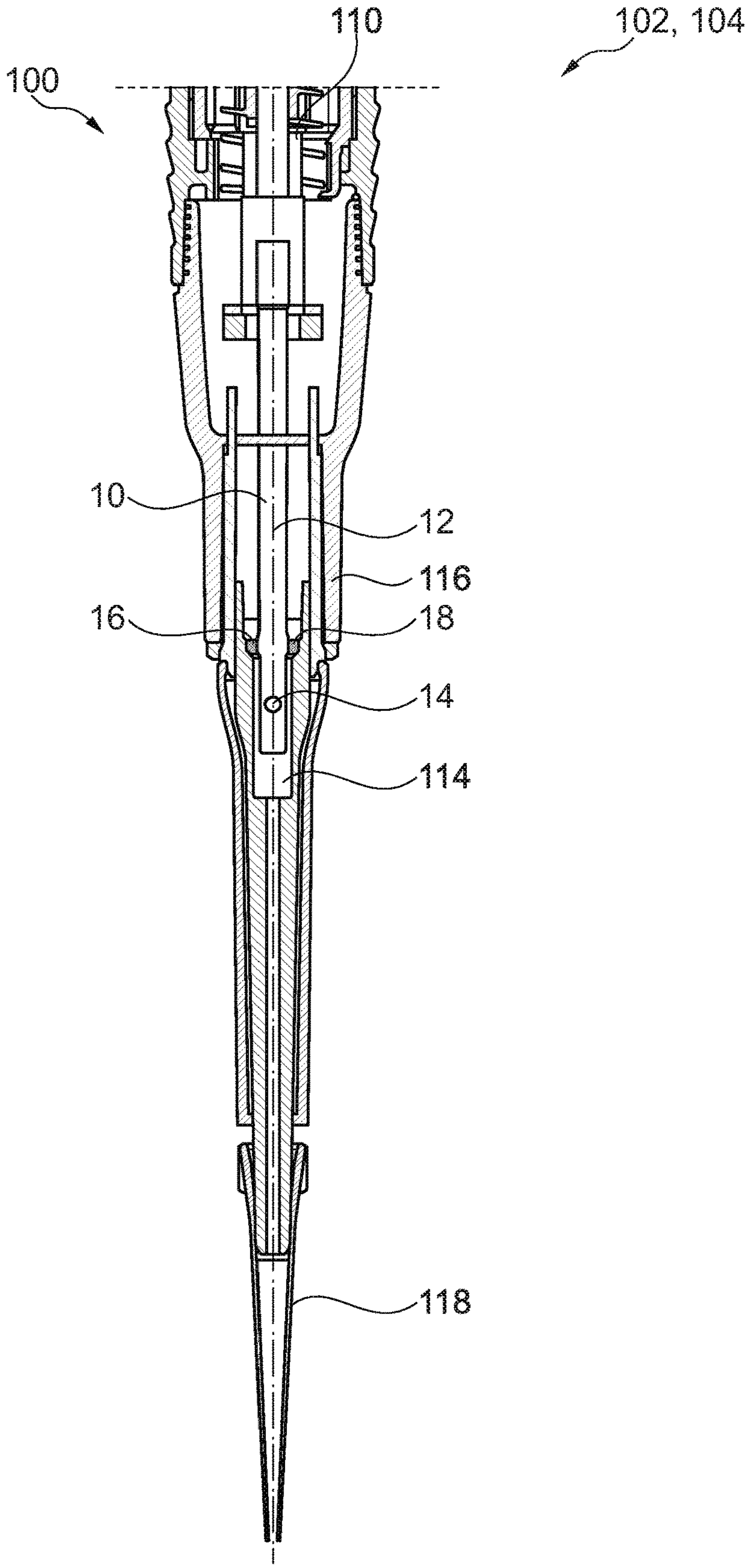
Figure 8:
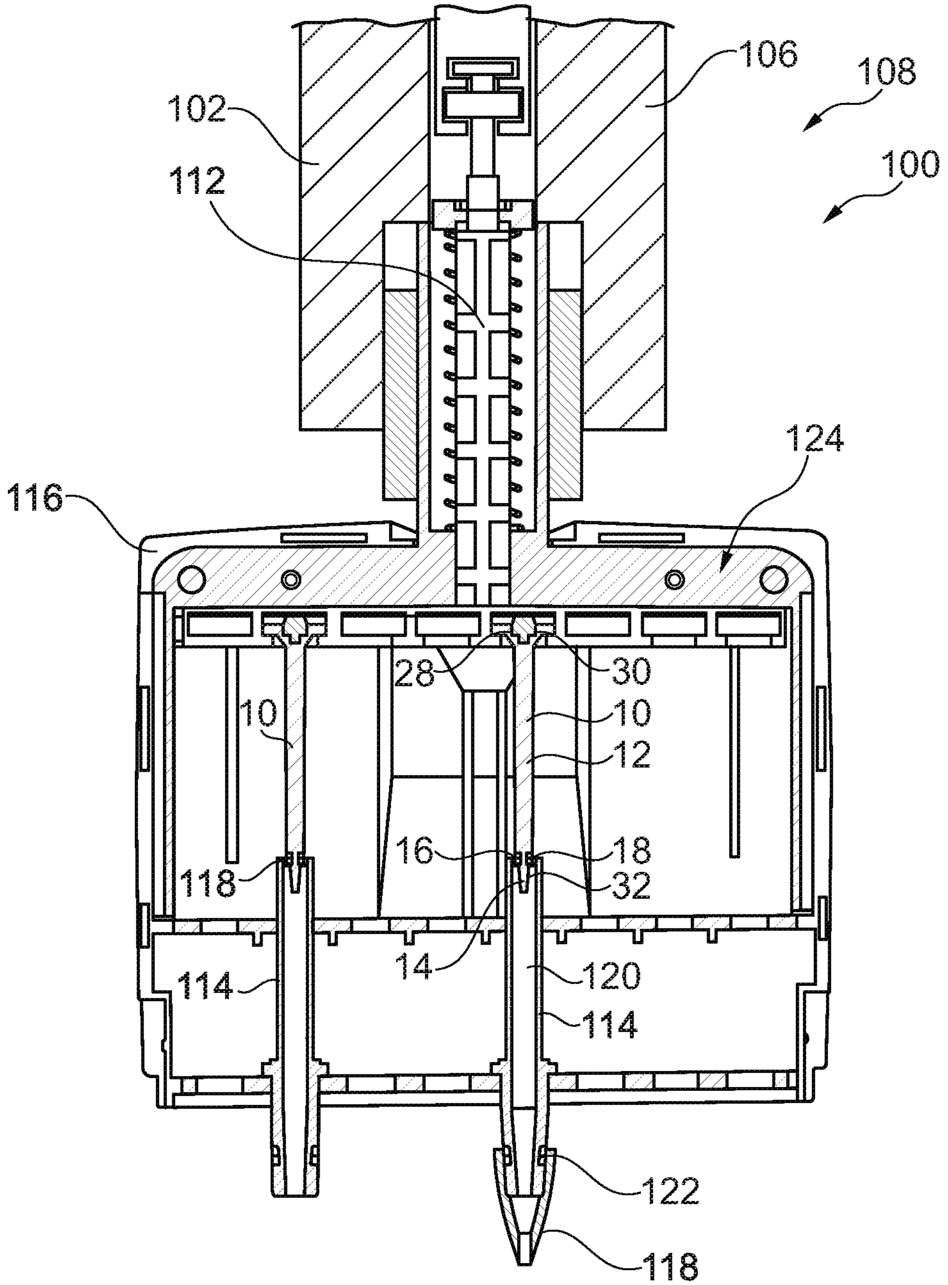
Figure 9:
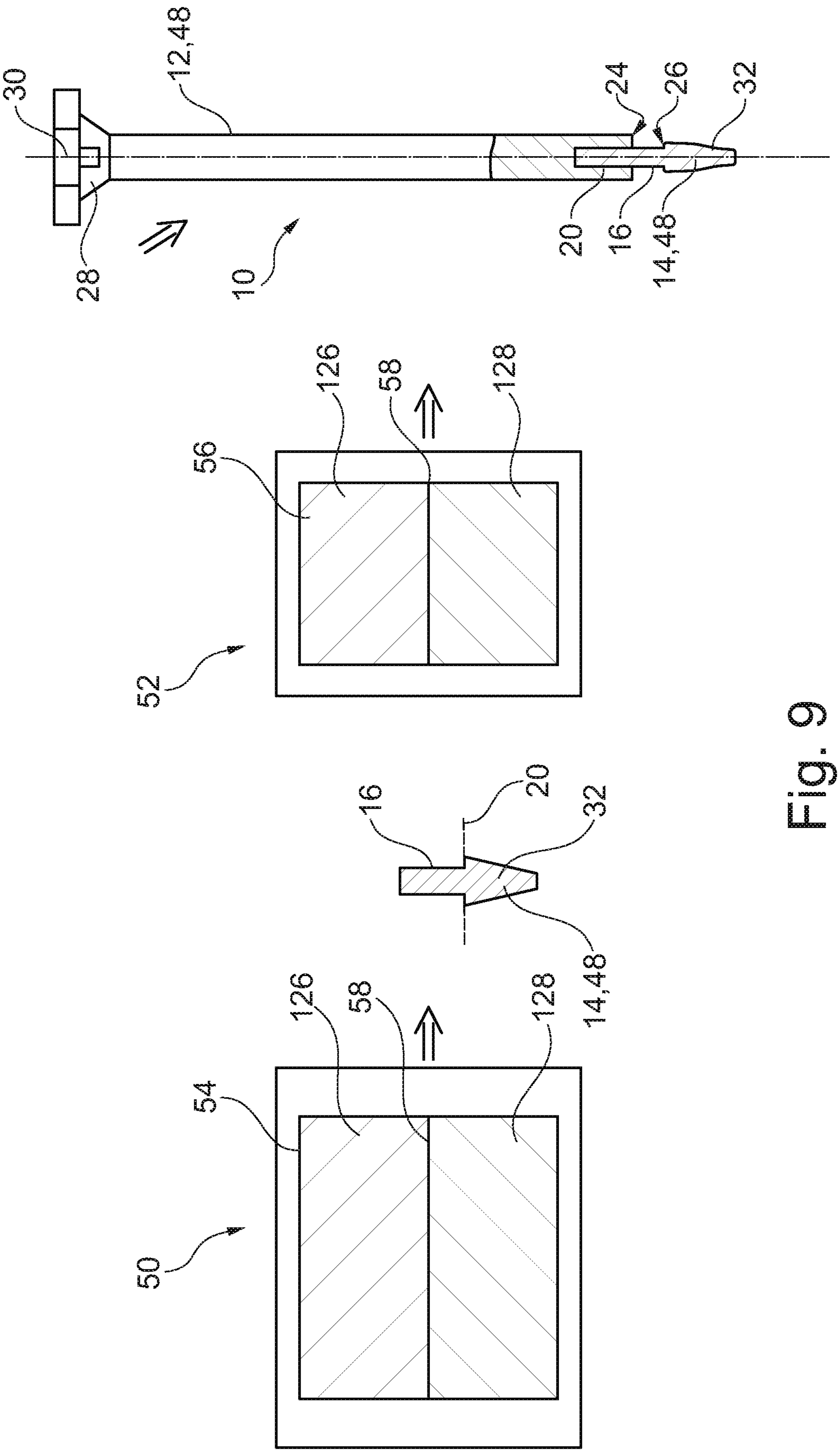

The invention is described below with reference to exemplary embodiments and on the basis of the associated drawings, in which:

FIG. 1 shows a prior art plunger rod for a pipette,

FIG. 2 shows a preferred exemplary embodiment of a plunger rod according to the invention for a liquid transfer system, FIG. 3 shows a first plunger rod portion of a plunger rod according to the invention, FIG. 4 shows a second plunger rod portion of a plunger rod according to the invention configured as a cover or dish, FIG. 5 shows an alternative exemplary embodiment of a plunger rod according to the invention with a first plunger rod portion and a second plunger rod portion configured as a plunger tip, FIG. 6 shows the plunger rod according to FIG. 5 with a sealing element arranged on the sealing seat, FIG. 7 shows a liquid transfer device in the form of a manual air displacement pipette with a plunger rod according to the invention, FIG. 8 shows a multichannel bottom part for a pipette with a plurality of plunger rods according to the invention, and FIG. 9 is a schematic representation of a manufacturing process for producing a plunger rod according to the invention.

FIG. 1 shows a prior art plunger rod 10 for a pipette 102. The plunger rod 10 is constructed in one-piece as an injection molding 48. To produce the plunger rod 10 as an injection molding, as shown in FIG. 1 a parting line is needed in an injection mold 54 to enable demolding of the injection molding 48 from the injection mold 54. In this case, the mold parting line 58 extends into a first mold half 126 and a second mold half 128 of the injection mold 54 along a longitudinal axis A of the plunger rod 10, such that, depending on the manufacturing process, parting line flash 22 arises, which extends over the entire length L of the plunger rod 10. The parting line flash 22 means there is a risk that a sealing element 18 will not lie fluid-tightly against a sealing seat 16 of the plunger rod 10 and a leak may therefore occur.

FIG. 2 shows a first exemplary embodiment of a plunger rod 10 according to the invention for a liquid transfer device 100 shown in FIG. 7. The plunger rod 10 comprises a first plunger rod component 12 and a second plunger rod component 14 arranged concentrically to the first plunger rod component 12, wherein both plunger rod components 12, 14 take the form of injection moldings 48. The plunger rod 10 has a longitudinal axis A and a length L. The first plunger rod component 12 has a shaft 38, in which a recess 40 is formed for producing a latching connection 42 with the second plunger rod component 14.

The second plunger rod component 14 is configured as a cover 34 or a dish 36, which is arranged concentrically to the first plunger rod component 12 and in particular is pulled up over the shaft 38 onto the first plunger rod component 12. To this end, as shown in FIG. 4, a central opening 44 is formed in the second plunger rod component, in the cover 34 or dish. A first limit stop 24 is formed on the first plunger rod component 12 and a second limit stop 26 on the second plunger rod component 14, for a sealing element 18. A sealing seat 16 for receiving the sealing element 18 is formed between the first limit stop 24 and the second limit stop 26.

FIG. 3 shows an individual part drawing of the first plunger rod component 12 prior to connection with the second plunger rod component 14 to form the plunger rod 10. A fastening mechanism 30 is provided at an end 28 of the first plunger rod component 12 remote from the sealing seat 16. FIG. 3 furthermore shows the recess 40 in the shaft 38 of the first plunger rod component 12 which defines the position of the cover 34 or the dish 36 after pushing onto the shaft and so enables the cover 34 or dish 36 to latch into this recess 40.

FIG. 4 shows a cover 34 or a dish 36 as second plunger rod component 12. The cover 34 or dish 36 has a central opening 44, latching lugs 46 being formed on the dish 36 or the cover 34 which project into the central opening 44. The latching lugs 46 are configured to latch into the recess 40 in the shaft 38 of the first plunger rod component 12 and there produce an interlocking connection, which defines the position of the cover 34 or dish 36 relative to the first plunger rod component 12 and thus the length of the sealing seat 16.

FIG. 5 shows an alternative exemplary embodiment of a plunger rod 10 according to the invention for a liquid transfer device 100. The exemplary embodiment shown in FIG. 5 is helpful in particular for small plunger rods 10 with a small diameter, in particular for plunger rods 10 of multichannel bottom parts of a multichannel pipette. In contrast to the exemplary embodiment shown in FIG. 2 to FIG. 4, in this exemplary embodiment the plunger rod 10 is not constructed by assembling two plunger rod components 12, 14 but rather by a two-component injection molding method. In this case, first of all the second plunger rod component 14 is produced in the form of the plunger tip 32 and this plunger tip 32 is connected interlockingly to the first plunger rod component 12 in a second injection molding process. Here, the plunger tip 32 is formed concentrically and as an axial extension of the first plunger rod component 12. On the plunger tip 32, the sealing seat 16 for the plunger rod 10 is shown, together with a lower limit stop 26 for a sealing element 18 received on the sealing seat 16 and shown in FIG. 6. An upper limit stop 24 for the sealing element 18 is shown on the first plunger rod component 12, said limit stop bounding the sealing seat 16 in the axial direction.

FIG. 6 shows the plunger rod 10 shown in FIG. 5 with a sealing element 18 pulled onto the sealing seat 16.

FIG. 7 shows a liquid transfer device 100 in the form of a pipette 102, which is configured as a mechanical single channel pipette 104. The pipette 102 comprises an actuating element 110, which is in operative connection with a plunger rod 10 displaceable in a cylinder 114, in order to aspirate a liquid and deliver it again in controlled manner in a subsequent working step. The cylinder 114 is arranged in a body 116 of the pipette 102. The plunger rod 10 takes the form of a multipart plunger rod 10 comprising a first plunger rod component 12 and a second plunger rod component 14 arranged concentrically to the first plunger rod component 12. A plunger rod 10 as described in FIGS. 2 to 4 may in particular be used in such a pipette 102. A receptacle for receiving a pipette tip 118 is formed at a lower end portion of the pipette 102.

FIG. 8 shows a liquid transfer device 100 in the form of a multichannel bottom part 108 for a multichannel pipette 106. The multichannel bottom part 108 comprises a supporting frame 124, in which a plurality of mutually parallel cylinders 114 enclosing liquid transfer compartments 120 are arranged. A body 116 of the multichannel bottom part 108 is fastened to the supporting frame 124. The multichannel bottom part 108 further comprises a plunger actuator 112, which is in operative connection with the various plunger rods 10 of the mutually parallel cylinders 114. For reasons of clarity, only two of eight cylinders 114 are shown in FIG. 8. At an end of the cylinder 114 extending out of the body 116, a sealing seat 122 is formed to receive a pipette tip. As shown in FIGS. 5 and 6, the plunger rod 10 comprises a first plunger rod component 12 and a second plunger rod component 14, which is configured as a plunger tip 32 and materially bonded to the first plunger rod component 12. Furthermore, a sealing seat 16 for receiving a sealing element 18 is formed on the plunger rod 10 between the first plunger rod component 12 and the second plunger rod component 14. At an end 28, remote from the sealing seat 16, of the first plunger rod component 12, a fastening mechanism 30 for fastening the plunger rod 10 to the plunger actuator 112 is formed.

FIG. 9 is a schematic representation of a method for producing such a plunger rod 10. In a first method step, the second plunger rod component 14 is produced as an injection molding 48 in the form of a plunger tip 32 in a first injection molding machine 50 with a first injection mold. A mold parting line 58 is here provided for demolding the plunger tip 32. In a second method step, the plunger tip 32 is inserted into a second injection mold 56, which is arranged in a second injection molding machine 52. Alternatively, both injection molding processes may also be performed with the same injection molding machine 50. The first plunger rod component 12 is here injected onto the plunger tip 32, resulting in the finished plunger rod 10. By dividing up the injection molding process, it is possible to avoid parting line flash 22 in the region of the sealing seat 16. When producing the plunger tip 32, a mold parting line 20 may here be provided in such a way that the sealing seat 16 lies in a first mold half 126 and the conical or frustoconical tip lies in a second mold half 128.

LIST OF REFERENCE NUMERALS

10 Plunger rod
12 First plunger rod component
14 Second plunger rod component
16 Sealing seat
18—Sealing element
20 Parting line
22 Parting line flash
24 First limit stop
26 Second limit stop
28 Remote end
30 Fastening mechanism
32 Plunger tip
34 Cover
36 Dish
38 Shaft
40 Recess
42 Latching connection
44 Central opening
46 Latching lug
48 Injection molding
50 First injection molding machine
52 Second injection molding machine
54 First injection mold
56 Second injection mold
58 Mold parting line
100 Liquid transfer device
102 Pipette
104 Single channel pipette
106 Multichannel pipette
108 Multichannel bottom part
110 Actuation element
112 Plunger actuator
114 Cylinder
116 Body
118 Pipette tip
120 Liquid transfer compartment
122 Sealing element
124 Supporting frame
126 First mold half
128 Second mold half

The invention claimed is:

1. A plunger rod (10) for a liquid transfer device (100), wherein the plunger rod (10) is of two or multipart construction and has a first plunger rod component (12), which can be brought into operative connection with an actuating device (110) of the liquid transfer device (100), and a second plunger rod component (14), as well as a sealing seat (16) for receiving a sealing element (18) for the plunger rod (10), wherein a parting line (20) between the first plunger rod component (12) and the second plunger rod component (14) is configured such that the sealing seat (16) is free of parting line flash (22), wherein the sealing seat (16) is configured to receive the sealing element (18) between the first plunger rod component (12) and the second plunger rod component (14).

2. The plunger rod (10) according to claim 1, wherein the second plunger rod component (14) is arranged or configured concentrically to the first plunger rod component (12).

3. The plunger rod (10) according to claim 1, wherein the first plunger rod component (12) forms a first limit stop (24) for the sealing element (18) received in the sealing seat (16) and the second plunger rod component (14) forms a second limit stop (26) for the sealing element (18) received in the sealing seat (16).

4. The plunger rod (10) according to claim 1, wherein the first plunger rod component (12) has, at its end (28) remote from the sealing seat (16), a fastening mechanism (30) for a plunger actuator (112) of a pipette (102) or a multichannel bottom part (108) for a pipette (102).

5. The plunger rod (10) according to claim 1, wherein the second plunger rod component (14) is configured as a plunger tip (32), which is arranged as an axial extension of the first plunger rod component (12).

6. The plunger rod (10) according to claim 1, wherein the second plunger rod component (14) is configured as a cover (34) or dish (36) which is connected interlockingly or force-lockingly with the first plunger rod component (12).

7. The plunger rod (10) according to claim 6, wherein the first plunger rod component (12) has a shaft (38), wherein a recess (40) is formed in the shaft (38) for form-locking connection of the cover (34) or dish (36) by way of a latching connection (42).

8. The plunger rod (10) according to claim 7, wherein the dish (34) or the cover (36) has a central opening (44), wherein at least one latching lug (46) is formed at the central opening (44) for latching into the recess (40) in the shaft (38) of the first plunger rod component (12).

9. The plunger rod (10) according to claim 1, wherein the first plunger rod component (12) and the second plunger rod component (14) are made from the same plastics material.

10. A method for producing the plunger rod (10) according to claim 1, wherein the method comprises the following method steps:

producing the second plunger rod component (14) of the plunger rod (10) in a first injection molding process, producing the first plunger rod component (12) of the plunger rod (10) in a second injection molding process, connecting the first plunger rod component (12) of the plunger rod (10) with the second plunger rod component (14) of the plunger rod (10), wherein the sealing seat (16) for receiving the sealing element (18) for the plunger rod (10) is located away from a mold parting line (58) of an injection mold (54, 56) for producing the plunger rod (10).

11. The method for producing the plunger rod (10) according to claim 10, wherein the plunger rod (10) is produced using a two-component injection molding method, in which in a first injection molding process the second plunger rod component (14) is produced and this second plunger rod component (14) is molded around in sections in a second injection molding process by the first plunger rod component (12), such that the second plunger rod component (14) is concentric to the first plunger rod component (12) and extends in the axial direction as an extension of the first plunger rod component (12).

12. The method for producing the plunger rod (10) according to claim 11, wherein the second plunger rod component (14) is inserted as an insert into the injection mold (56) for the second injection molding process to produce the first plunger rod component (12).

13. The method for producing the plunger rod (10) according to claim 12, wherein the second plunger rod component (14) is pulled, by way of a central opening (44) in the second plunger rod component (14), onto the first plunger rod component (12) and connected force-lockingly or interlockingly therewith.

14. A liquid transfer device (100) for drawing up and subsequently delivering a liquid with the plunger rod (10) according to claim 1.

* * * * *